Patented Oct. 17, 1933

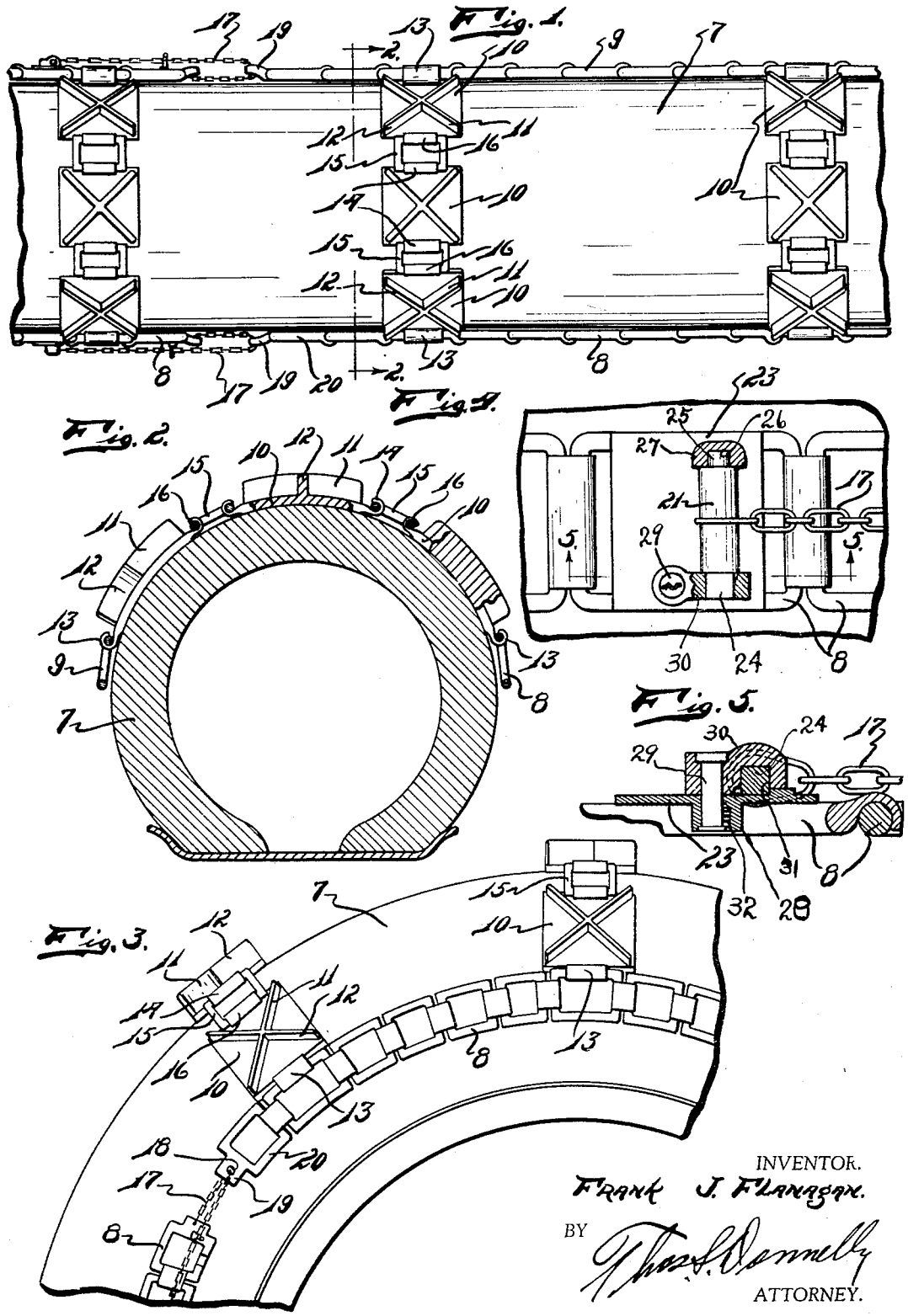

1,930,793

UNITED STATES PATENT OFFICE 1,930,793

ANTISKID DEVICE

Frank J. Flanagan, Detroit, Mich.

Application May 31, 1932. Serial No. 614,366

2 Claims. (Cl. 24—68)

My invention relates to a new and useful improvement in an anti-skid device and has for its object a provision of a device which may be mounted on a vehicle wheel to prevent skid of the same over slippery surfaces.

It is another object of the present invention to provide a device of this class which will be of simple construction, economical of manufacture, durable, highly efficient in use and easily and quickly applied to or removed from a vehicle wheel.

Another object of the invention is the provision of a device of this class having engagement members so arranged and constructed that efficient resistance against skidding may be offered while at the same time damage to pavements such as asphalt and the like will be avoided.

Another object of the invention is a provision of a device of this class of a construction whereby the device may be easily and quickly adjusted to accommodate vehicle wheels of various sizes within certain limits.

The invention consists in the combination and arrangement of parts hereinafter described and claimed.

The invention will be best understood by a reference to the accompanying drawing which forms a part of this specification, and in which, Fig. 1 is a fragmentary top plan view of the invention showing it applied, Fig. 2 is a sectional view taken on line 2—2 of Fig. 1, Fig. 3 is a fragmentary side elevational view of the invention showing it applied, Fig. 4 is a fragmentary side elevational view slightly enlarged.

Fig. 5 is a sectional view taken on line 5—5 of Fig. 4.

In the drawing, I have illustrated the invention mounted on a vehicle tire casing 7. The invention consists of a pair of chains 8 and 9 extended on opposite sides of the tire casing 7. These chains 8 and 9 are connected by transversely extended connecting members at spaced intervals. These connecting members form the antiskid engagement members and consist of a plate 10 on the outer surface of which are formed outwardly projecting ribs 11 and 12 extended transversely of the plate 10 so as to cross each other and form a cross. The end plates are provided with a knuckle 13 which is pivotally connected to a link of the chain 8 and 9. The center plate is also provided with knuckles which are connected by the link 15 to the knuckles 16 on the inner end of the end plates.

As shown in Fig. 1, the chains 8 and 9 are not endless but the ends thereof are secured together by the chain 17, one end of which is secured to one end of the chains 8 or 9 and the other end of which is passed through an opening 18 formed in a plate 19 which extends outwardly from the end link 20. The opposite end of the chain carries a cross bar 21 which, at one end is formed square in cross section as at 24. The opposite end is provided with a trunnion 25 which engages in a pocket 26 formed in a lug 27 projecting upwardly from a supporting plate 23. Projecting downwardly from the supporting plate 23 is a lock housing 28 into which engages a lock barrel 29 which serves as a pivot for a retainer 30 having a flat faced opening 31 for reception of the flat faced trunnion 24 locking finger 32 are carried by the barrel 29 and the structure is such that when the lock mechanism is operated to withdraw the finger 32 from operative position the member 30 may be swung on the lock barrel 29 as a pivot thus permitting disengagement of the trunnion 24 from the retainer 30. In use, the chain 17 may be wound on the cross bar 21 until the proper length is arrived at to retain the chains 8 and 9 in taut condition around the entire casing 7. The trunnion 25 will then be inserted into the pocket 26 and the cross bar 21 brought into position so that the retainer 30 may be swung thereon. The opening 31 in this retainer being sufficiently large to permit its being swung into embracing position on the flat faced trunnion 24 and the engagement therewith is sufficient to prevent a rotation of the cross bar 21 so that an unwinding of the chain cannot be effected. In this way the device may be adjusted to retain the chains 8 and 9 taut for the various air pressure which may be developed in the vehicle tire with which used.

The cross shaped members 11 and 12 will serve to prevent skidding on slippery surfaces and on account of their formation, damage to a soft pavement would not be effected.

While I have illustrated and described the preferred form of construction, I do not wish to limit myself to the precise details of structure shown but desire to avail myself of such variations and modifications as may come within the scope of the appended claims.

Having thus described my invention what I claim as new and desire to obtain by Letters Patent is:

1. A fastener for a skid chain comprising: a flexible connecting member carried by one end of a side chain; a plate on the other end of said side chain for engaging said flexible member; a bar carried by the free end of said flexible member; a flat faced portion at one end of said bar; a trunnion on the other end of said bar; a supporting plate mounted on the first-mentioned end of said chain inwardly of the end thereof; a lug mounted on said supporting plate to provide a bearing for said trunnion, said flexible member being windable upon said bar upon the winding of the same; and means on said supporting plate for engaging said flat faced portion of said bar and preventing unwinding of said flexible member.

2. A fastener for a skid chain comprising: a flexible connecting member carried by one end of a side chain; a plate on the other end of said side chain for engaging said flexible member; a bar carried by the free end of said flexible member; a flat faced portion at one end of said bar; a trunnion on the other end of said bar; a supporting plate mounted on the first-mentioned end of said chain inwardly of the end thereof; a lug mounted on said supporting plate to provide a bearing for said trunnion, said flexible member being windable upon said bar upon the winding of the same; swingable means on said supporting plate for engaging, when swung to operative position, said flat faced portion of said bar for preventing unwinding of said flexible member therefrom; and key operated means for preventing swinging of said swingable means from operative position.

FRANK J. FLANAGAN.